United States Patent
Chen

(12) 
(10) Patent No.: US 11,165,256 B2
(45) Date of Patent: Nov. 2, 2021

(54) POWER SUPPLY SYSTEM AND POWER MONITORING DEVICE

(71) Applicant: Ming-Tsung Chen, Taipei (TW)

(72) Inventor: Ming-Tsung Chen, Taipei (TW)

(*) Notice: Subject to any disclaimer, the term of this patent is extended or adjusted under 35 U.S.C. 154(b) by 111 days.

(21) Appl. No.: 16/597,389

(22) Filed: Oct. 9, 2019

(65) Prior Publication Data
US 2021/0111564 A1 Apr. 15, 2021

(51) Int. Cl.
*H02J 3/38* (2006.01)
*H02J 13/00* (2006.01)
*G05B 15/02* (2006.01)

(52) U.S. Cl.
CPC .............. *H02J 3/383* (2013.01); *G05B 15/02* (2013.01); *H02J 13/0017* (2013.01)

(58) Field of Classification Search
CPC ........ H02J 3/383; H02J 13/0017; G05B 15/02
See application file for complete search history.

(56) References Cited

U.S. PATENT DOCUMENTS

| | | | | |
|---|---|---|---|---|
| 2012/0253541 A1* | 10/2012 | Arditi | .................... | H02J 1/102 700/298 |
| 2012/0255591 A1* | 10/2012 | Arditi | ...................... | H02J 1/00 136/244 |
| 2013/0026839 A1* | 1/2013 | Grana | .................... | H02J 3/381 307/71 |
| 2013/0026840 A1* | 1/2013 | Arditi | .................... | H02M 7/44 307/77 |
| 2013/0026842 A1* | 1/2013 | Arditi | .................... | H02J 3/383 307/82 |
| 2013/0026843 A1* | 1/2013 | Arditi | .................... | H02J 1/102 307/82 |
| 2018/0316191 A1* | 11/2018 | Zhu | ........................ | H02J 3/383 |

* cited by examiner

*Primary Examiner* — Charles R Kasenge
(74) *Attorney, Agent, or Firm* — Li & Cai Intellectual Property (USA) Office

(57) ABSTRACT

A power supply system includes a plurality of solar power generation device groups, a power monitoring device group, and a power transforming device. The power monitoring device group includes a plurality of power monitoring devices, and each of the power monitoring devices includes a processing module, a serial control module, and a power detecting module. At least one power parameter detected by the power detecting module of each of the power monitoring devices is provided to the processing module. The processing module transmits the at least one power parameter to a control system through the serial control module.

8 Claims, 3 Drawing Sheets

POWER SUPPLY SYSTEM AND POWER MONITORING DEVICE

FIELD OF THE DISCLOSURE

The present disclosure relates to a power supply system and a power monitoring device, and more particularly to a power supply system and a power monitoring device with a communication function.

BACKGROUND OF THE DISCLOSURE

Currently, solar power equipment does not have a communication device. Therefore, it is difficult to perform real-time monitoring on the solar power equipment. If communication devices are to be implemented in the solar power equipment, a cost thereof would be accordingly increased.

Therefore, providing a cost-effective power supply system and a power monitoring device is an important issue in the industry.

SUMMARY OF THE DISCLOSURE

In response to the above-referenced technical inadequacies, the present disclosure provides a power supply system. The power supply system includes a plurality of solar power generation device groups, a power monitoring device group, and a power transforming device. Each of the solar power generation device groups includes a plurality of solar power generation devices. The power monitoring device group includes a plurality of power monitoring devices. Each of the power monitoring devices is electrically connected to one of the solar power generation device groups. Each of the power monitoring devices includes a processing module, a serial control module, and a power detecting module. The serial control module is electrically connected to the processing module. The serial control modules of the power monitoring devices communicate with each other. The power detecting module is electrically connected to the processing module for detecting at least one power parameter of the solar power generation device connected to the power detecting module. The power transforming device is electrically connected to each of the power monitoring devices for transforming electrical power transmitted by the solar power generation device groups. The at least one power parameter detected by the power detecting module of each of the power monitoring device is provided to the processing module. The processing module transmits the at least one power parameter to a control system through the serial control module.

In certain embodiments, the present disclosure provides a power monitoring device. The power monitoring device is electrically connected to a solar power generation device group and a power transforming device. The solar power generation device group includes at least one solar power generation device. The power monitoring device includes a processing module, a serial control module, a current detecting module, and a voltage detecting module. The serial control module is electrically connected to the processing module. The current detecting module includes at least one current detecting unit. The current detecting module is electrically connected to the processing module, the solar power generation device group, and the power transforming device for detecting at least one current value of the at least one solar power generation device of the solar power generation device group. The voltage detecting module includes at least one voltage detecting unit. The voltage detecting module is electrically connected to the processing module and the solar power generation device group for detecting at least one voltage value of the at least one solar power generation device of the solar power generation device group.

Therefore, the power supply system and the power monitoring device are capable of monitoring multiple solar power generation devices to obtain power parameters, and transmit the power parameters. Therefore, the cost for monitoring can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
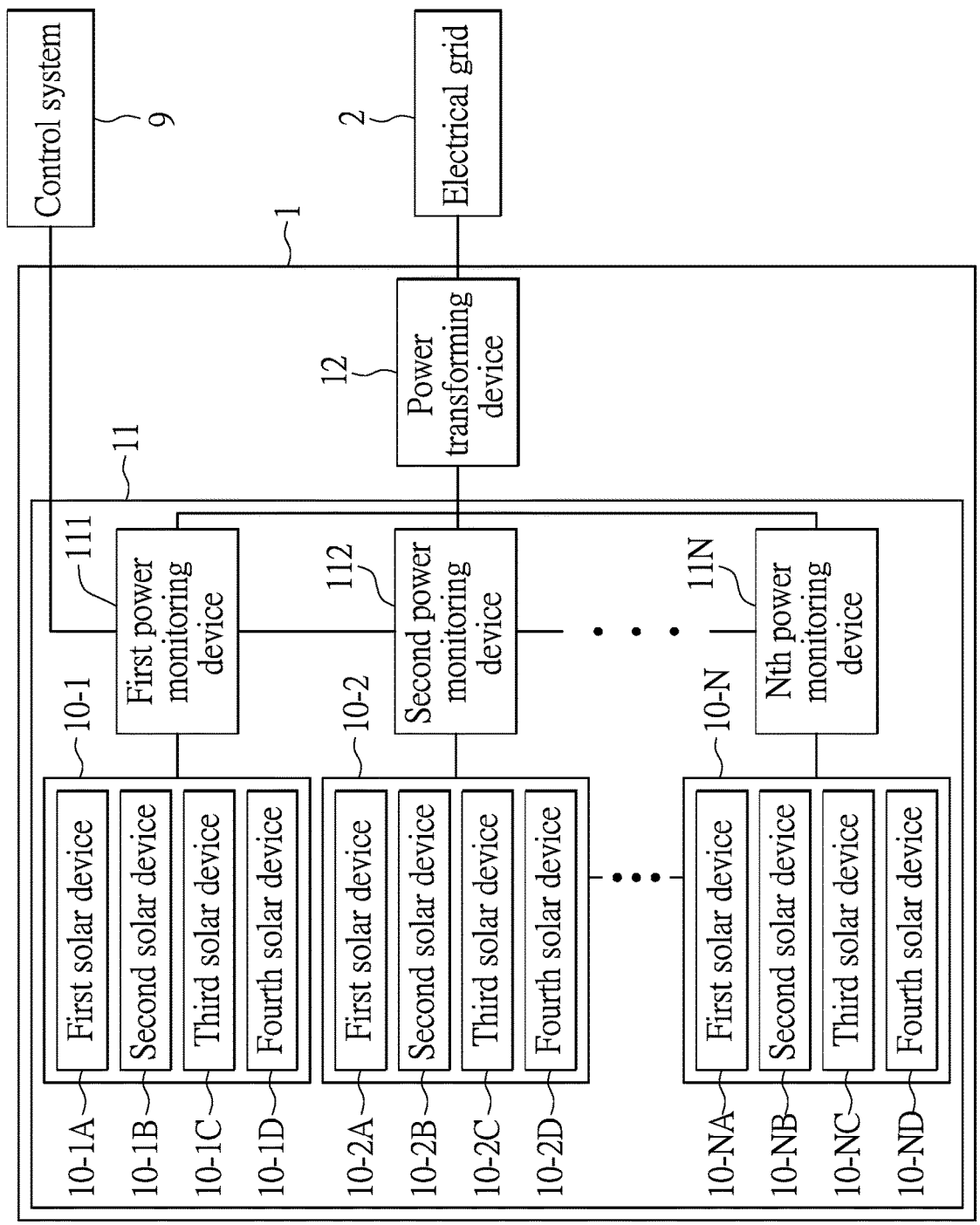
FIG. 1 is a block diagram of a power supply system connected to an electrical grid according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
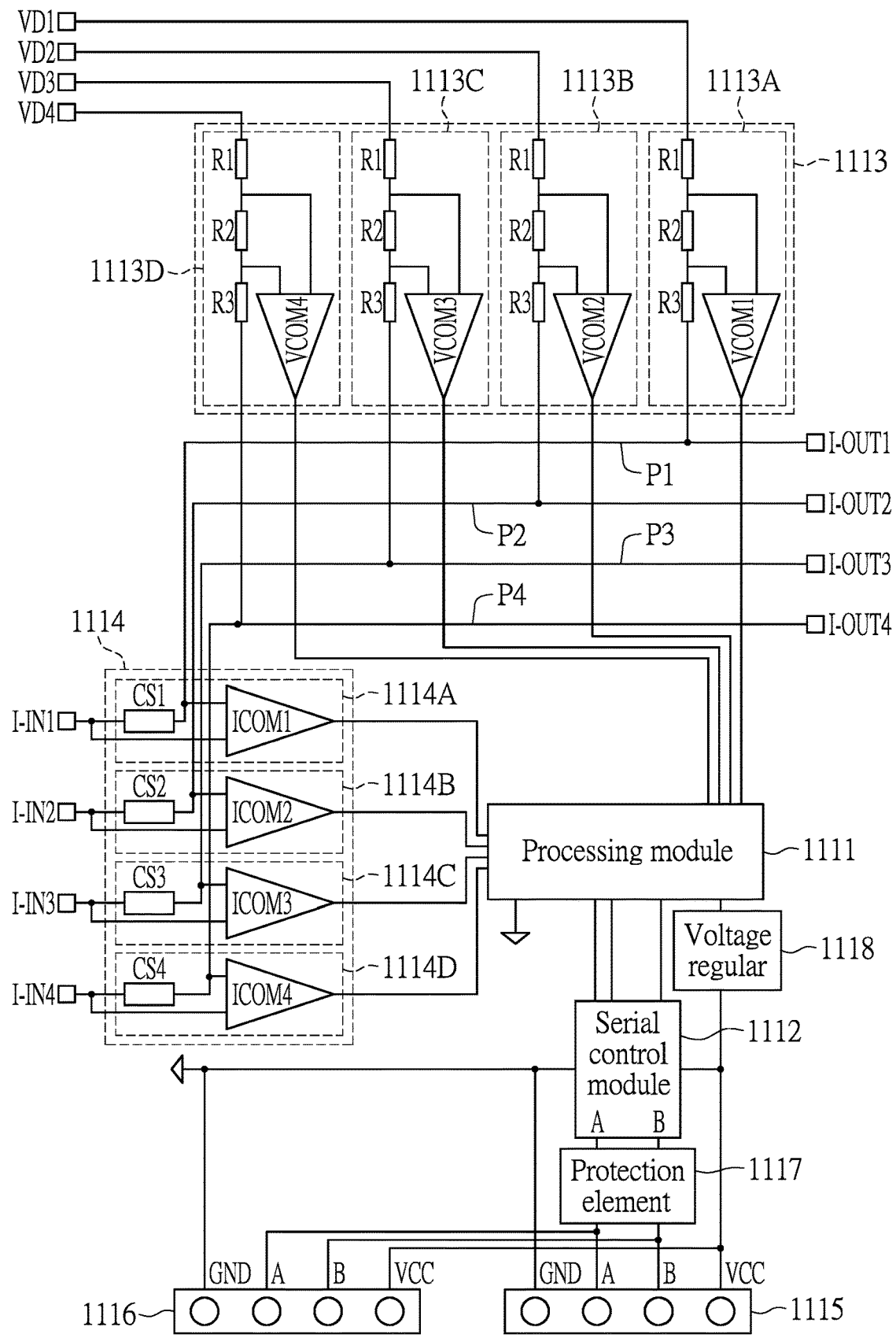
FIG. 2 is a block diagram of a power monitoring device according to the embodiment of the present disclosure.

Referring to FIG. 1 and FIG. 2, FIG. 1 is a block diagram of a power supply system connected to an electrical grid according to an embodiment of the present disclosure. FIG. 2 is a block diagram of a power monitoring device according to the embodiment of the present disclosure.

A power supply system 1 is electrically connected to an electrical grid 2. The electrical grid 2 is a city grid or a high-voltage power transmission system. The power supply system 1 includes a plurality of solar power generation device groups 10-1 to 10-N, a power monitoring device group 11, and a power transformation device 12. Each of the solar power generation device groups 10-1 to 10-N includes a first solar power generation device, a second solar power generation device, a third solar power generation device, and a fourth solar power generation device.

The power monitoring device group 11 includes a plurality of power monitoring devices including a first power monitoring device 111, a second power monitoring device 112 to an Nth power monitoring device 11N. N is an integer, and N≥1. In other words, in other embodiments, the power monitoring device group 11 can only include one power monitoring device, but not limited in the present disclosure. When the number of the power monitoring devices is larger than two, the power monitoring devices of the power monitoring device group 11 communicate with each other.

In the embodiment, each of the power monitoring devices is electrically connected to four solar power generation devices (not shown). The first power monitoring device 111 is taken as an example for description in the following paragraphs. A structure and functions of each of the power monitoring devices are similar to those of the first power monitoring device 111, and should be omitted.

Figure 3:
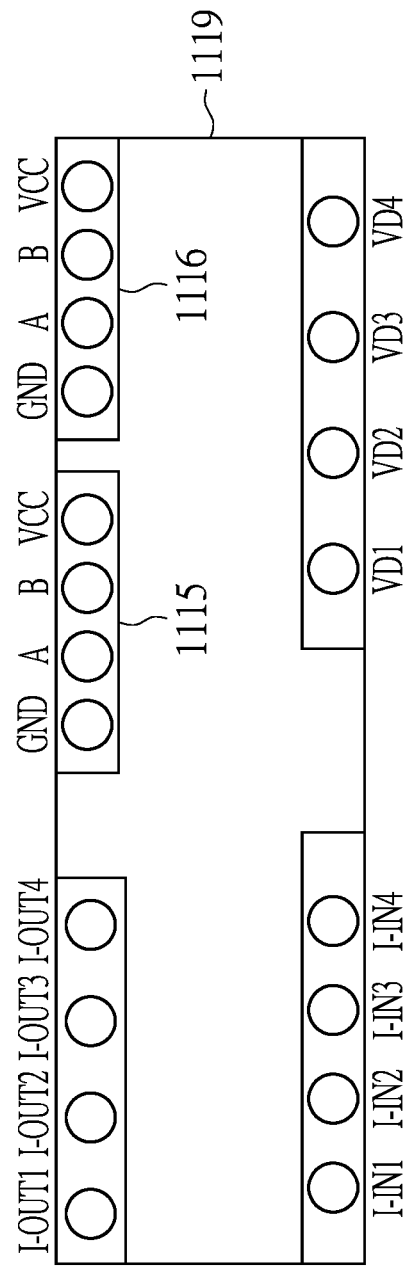
FIG. 3 shows a terminal arrangement of a printed circuit board of the power monitoring device according to the embodiment of the present disclosure.

Referring to FIG. 3, the first power monitoring device 111 includes a processing module 1111, a serial control module 1112, a voltage detecting module 1113, a current detecting module 1114, a first connector 1115, a second connector 1116, a protection element 1117, a voltage regulator 1118, and a printed circuit board 1119.

The processing module 1111, the serial control module 1112, the voltage detecting module 1113, the current detecting module 1114, the first connector 1115, the second connector 1116, and the protection element 1117 are mounted on the printed circuit board 1119.

The processing module 1111 is electrically connected to the serial control module 1112, the voltage detecting module 1113, and the current detecting module 1114. The serial control module 1112 is electrically connected to the first connector 1115 and the second connector 1116 through the protection element 1117. The serial control module 1112 is an RS485 serial control module or an RS232 serial control module. The protection element 1117 is a transient-voltage-suppression diode (TVS).

In the embodiment, the first connector 1115 and the second connector 1116 respectively include a ground terminal GND, a first signal terminal A, a second signal terminal B, and a DC power terminal VCC. The voltage regulator 1118 is electrically connected to the DC power terminal VCC of the first connector 1115, the DC power terminal VCC of the second connector 1116, and the processing module 1111.

The voltage detecting module 1113 includes a first voltage detecting unit 1113A, a second voltage detecting unit 1113B, a third voltage detecting unit 1113C, and a fourth voltage detecting unit 1113D. The number of the voltage detecting units can be adjusted, and is not limited in the present disclosure.

The current detecting module 1114 includes a first current detecting unit 1114A, a second current detecting unit 1114B, a third current detecting unit 1114C, and a fourth current detecting unit 1114D. The number of the current detecting units can be adjusted, and is not limited in the present disclosure. In the embodiment, the voltage detecting module 1113 and the current detecting module 1114 can be taken as power detecting modules. In other embodiments, a power detecting module (not shown) can include a plurality of voltage detecting units 1113A-1113D and a plurality of current detecting units 1114A-1114D.

The first solar power generation device group 10-1 is taken as an example. The first voltage detecting unit 1113A is electrically connected to the first solar power generation device 10-1A for detecting a voltage value of the first solar power generation device 10-1A. The first current detecting unit 1114A is electrically connected to the first solar power generation device 10-1A for detecting a current value of the first solar power generation device 10-1A. The second voltage detecting unit 1113B is electrically connected to the second solar power generation device 10-1B for detecting a voltage value of the second solar power generation device 10-1B. The second current detecting unit 1114B is electrically connected to the second solar power generation device 10-1B for detecting a current value of the second solar power generation device 10-1B. The third voltage detecting unit 1113C is electrically connected to the third solar power generation device 10-1C for detecting a voltage value of the third solar power generation device 10-1C. The third current detecting unit 1114A is electrically connected to the third solar power generation device 10-1C for detecting a current value of the third solar power generation device 10-1C. The fourth voltage detecting unit 1113D is electrically connected to the fourth solar power generation device 10-1D for detecting a voltage value of the fourth solar power generation device 10-1A. The fourth current detecting unit 1114D is electrically connected to the fourth solar power generation device 10-1D for detecting a current value of the fourth solar power generation device 10-1D.

The printed circuit board 1119 includes a first current input terminal I-IN1, a second current input terminal I-IN2, a third current input terminal I-IN3, a fourth current input terminal I-IN4, a first current output terminal I-OUT1, a second current output terminal I-OUT2, a third current output terminal I-OUT3, a fourth current output terminal I-OUT4, a first electrical path P1, a second electrical path P2, a third electrical path P3, a fourth electrical path P4, a first voltage detecting terminal VD1, a second voltage detecting terminal VD2, a third voltage detecting terminal VD3, and a fourth voltage detecting terminal VD4.

The first current input terminal I-IN1 and the first voltage detecting terminal VD1 are electrically connected to the first solar power generation device 10-1A. The second current input terminal I-IN2 and the second voltage detecting terminal VD2 are electrically connected to the second solar power generation device 10-1B. The third current input terminal I-IN3 and the third voltage detecting terminal VD3 are electrically connected to the third solar power generation device 10-1C. The fourth current input terminal I-IN4 and the fourth voltage detecting terminal VD4 are electrically connected to the fourth solar power generation device 10-1D.

The first current output terminal I-OUT1, the second current output terminal I-OUT2, the third current output terminal I-OUT3, and the fourth current output terminal I-OUT4 are electrically connected to the power transforming device 12.

The first electrical path P1 is arranged between the first current input terminal I-IN1 and the first current output terminal I-OUT1, and the first electrical path P1 is electrically connected to the first current input terminal I-IN1 and the first current output terminal I-OUT1. The second electrical path P2 is arranged between the second current input terminal I-IN2 and the second current output terminal I-OUT2, and the second electrical path P2 is electrically connected to the second current input terminal I-IN2 and the second current output terminal I-OUT2. The third electrical path P3 is arranged between the third current input terminal I-IN3 and the third current output terminal I-OUT3, and the third electrical path P3 is electrically connected to the third current input terminal I-IN3 and the third current output terminal I-OUT3. The fourth electrical path P4 is arranged between the fourth current input terminal I-IN4 and the fourth current output terminal I-OUT4, and the fourth electrical path P4 is electrically connected to the fourth current input terminal I-IN4 and the fourth current output terminal I-OUT4.

The first current detecting unit 1114A is arranged between the first current input terminal I-IN1 and the first current output terminal I-OUT1, and the first current detecting unit 1114A is electrically connected to the first current input terminal I-IN1 and the first current output terminal I-OUT1. The second current detecting unit 1114B is arranged between the second current input terminal I-IN2 and the second current output terminal I-OUT2, and the second current detecting unit 1114B is electrically connected to the second current input terminal I-IN2 and the second current output terminal I-OUT2. The third current detecting unit 1114C is arranged between the third current input terminal I-IN3 and the third current output terminal I-OUT3, and the third current detecting unit 1114C is electrically connected to the third current input terminal I-IN3 and the third current output terminal I-OUT3. The fourth current detecting unit 1114D is arranged between the fourth current input terminal I-IN4 and the fourth current output terminal I-OUT4, and the fourth current detecting unit 1114D is electrically connected to the fourth current input terminal I-IN4 and the fourth current output terminal I-OUT4.

The first voltage detecting unit 1113A is electrically connected to the first voltage detecting terminal VD1 and the first electrical path P1. The second voltage detecting unit 1113B is electrically connected to the second voltage detecting terminal VD2 and the second electrical path P2. The third voltage detecting unit 1113C is electrically connected to the third voltage detecting terminal VD3 and the third electrical path P3. The fourth voltage detecting unit 1113D is electrically connected to the fourth voltage detecting terminal VD4 and the fourth electrical path P4.

In the embodiment, the first voltage detecting unit 1113A includes a first impedance element R1, a second impedance element R2, a third impedance element R3, and a first voltage comparator VCOM1. The first impedance element R1, the second impedance element R2, the third impedance element R3 of the first voltage detecting unit 1113A are serially connected, and are arranged between the first voltage detecting terminal VD1 and the first electrical path P1. Two input terminals of the first voltage comparator VCOM1 are respectively connected to two connection nodes between the first impedance element R1, the second impedance element R2, and the third impedance element R3 of the first voltage detecting unit 1113A to generate a first voltage value.

The second voltage detecting unit 1113B includes the first impedance element R1, a second impedance element R2, a third impedance element R3, and a second voltage comparator VCOM2. The first impedance element R1, the second impedance element R2, the third impedance element R3 of the second voltage detecting unit 1113B are serially connected, and arranged between the second voltage detecting terminal VD2 and the second electrical path P2. Two input terminals of the second voltage comparator VCOM2 are respectively connected to two connection nodes between the first impedance element R1, the second impedance element R2, and the third impedance element R3 of the second voltage detecting unit 1113B to generate a second voltage value.

The third voltage detecting unit 1113C includes a first impedance element R1, a second impedance element R2, a third impedance element R3, and a third voltage comparator VCOM3. The first impedance element R1, the second impedance element R2, the third impedance element R3 of the third voltage detecting unit 1113C are serially connected, and they are arranged between the third voltage detecting terminal VD3 and the third electrical path P3. Two input terminals of the third voltage comparator VCOM3 are respectively connected to two connection nodes between the first impedance element R1, the second impedance element R2, and the third impedance element R3 of the third voltage detecting unit 1113C for generating a third voltage value.

The fourth voltage detecting unit 1113D includes a first impedance element R1, a second impedance element R2, a third impedance element R3, and a fourth voltage comparator VCOM4. The first impedance element R1, the second impedance element R2, the third impedance element R3 of the fourth voltage detecting unit 1113D are serially connected, and they are arranged between the fourth voltage detecting terminal VD4 and the fourth electrical path P4. Two input terminals of the fourth voltage comparator VCOM4 are respectively connected to two connection nodes between the first impedance element R1, the second impedance element R2, and the third impedance element R3 of the fourth voltage detecting unit 1113D for generating a fourth voltage value.

The voltage comparators VCOM1-VCOM4 are electrically connected to the processing module 1111. In other words, output terminals of the voltage comparator VCOM1-VCOM4 respectively provide the first voltage value, the second voltage value, the third voltage value, and the fourth voltage value to the processing module 1111.

In the embodiment, the first current detecting unit 1114A includes a first current detecting impedance element CS1 and a first current comparator ICOM1. The first current detecting impedance element CS1 is arranged on a position along the first electrical path P1. Two input terminals of the first current comparator ICOM1 are electrically connected to two ends of the first current detecting impedance element CS1, respectively. An output terminal of the first current comparator ICOM1 is electrically connected to the processing module 1111.

The second current detecting unit 1114B includes a second current detecting impedance element CS2 and a second current comparator ICOM2. The second current detecting impedance element CS2 is arranged on a position along the second electrical path P2. Two input terminals of the second current comparator ICOM2 are electrically connected to two ends of the second current detecting impedance element CS2, respectively. An output terminal of the second current comparator ICOM2 is electrically connected to the processing module 1111.

The third current detecting unit 1114C includes a third current detecting impedance element CS3 and a third current comparator ICOM3. The third current detecting impedance element CS3 is arranged on a position along the third electrical path P3. Two input terminals of the third current comparator ICOM3 are electrically connected to two ends of the third current detecting impedance element CS3, respectively. An output terminal of the third current comparator ICOM3 is electrically connected to the processing module 1111.

The fourth current detecting unit 1114D includes a fourth current detecting impedance element CS4 and a fourth current comparator ICOM4. The fourth current detecting impedance element CS4 is arranged on a position along the fourth electrical path P4. Two input terminals of the fourth current comparator ICOM4 are electrically connected to two ends of the fourth current detecting impedance element CS4, respectively. An output terminal of the fourth current comparator ICOM4 is electrically connected to the processing module 1111.

In the embodiment, the ground terminal GND, the first signal terminal A, the second signal terminal B, and the DC power terminal VCC are electrically connected to the serial control module 1112.

The voltage regulator 1118 is arranged between the processing module 1111 and the DC power terminal VCC of the first connector 1115 and the second connector 1116 for transforming the DC power. In the embodiment, the voltage regulator 1118 is a low-dropout regulator (LDO). The voltage regulator 1118 is electrically connected to the DC power terminal VCC of the first connector 1115 and the DC power terminal VCC of the second connector 1116 for receiving a DC voltage.

In the embodiment, the power transforming device 12 can include one or more power transforming module(s) (not shown). Each power transforming module is electrically connected to one power monitoring device 111-11N for transforming the electrical energy provided by the solar power generation devices 10-1A~101D, 10-NA~10-ND. In the embodiment, the power transforming device 12 transforms the DC voltage provided by the solar power generation devices 10-1A~101D, 10-NA~10-ND into an AC voltage.

The number of the solar power generation devices of each of the solar power generation device groups 10-1~10-N can be adjusted, and is not limited in the present disclosure.

The processing module 1111 transmits the voltage values provided by the voltage detecting module 1113 and the current values provided by the current detecting module 1114 to a control system 9. The control system 9 can be a local server or a remote server.

The processing module 1111 and the serial control module 1112 communicate with each other by a universal asynchronous receiver/transmitter interface (UART).

In conclusion, the power supply system and the power monitoring device are capable of monitoring multiple solar power generation devices to obtain power parameters, and transmit the power parameters. Therefore, the cost for monitoring can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply system comprising:
    a plurality of solar power generation device groups, each of the solar power generation device groups including a plurality of solar power generation devices;
    a power monitoring device group including a plurality of power monitoring devices, each of the power monitoring devices electrically connected to one of the solar power generation device group, wherein each of the power monitoring device includes:
        a processing module;
        a serial control module electrically connected to the processing module, wherein the serial control modules of the power monitoring devices communicate with each other; and
        a power detecting module electrically connected to the processing module for detecting at least one power parameter of the solar power generation device connected to the power detecting module; and
    a power transforming device electrically connected to each of the power monitoring devices for transforming electrical power transmitted by the solar power generation device groups;
    wherein the at least one power parameter detected by the power detecting module of each of the power monitoring device is provided to the processing module, and the processing module transmits the at least one power parameter to a control system through the serial control module;
    wherein the power monitoring device further includes a printed circuit board having at least one current input terminal, at least one current output terminal, at least one voltage detecting terminal and at least one electrical path;
    wherein the at least one current input terminal is electrically connected to the at least one current output terminal through the at least one electrical path, and the at least one current detecting unit is arranged between the at least one current input terminal and the at least one current output terminal;
    wherein the at least one voltage unit is electrically connected to the at least one voltage detecting terminal and the at least one electrical path;
    wherein the printed circuit board further includes a DC power terminal, a first signal terminal, a second signal terminal, and a ground terminal, the DC power terminal, the first signal terminal, the second signal terminal, and the ground terminal are electrically connected to the serial control module.

2. The power supply system of claim 1, wherein the control system is a local server or a remote server.

3. The power supply system of claim 1, wherein the power detecting module at least includes a voltage detecting unit and a current detecting unit for detecting a voltage value and a current value of the solar power generation device, respectively.

4. The power supply system of claim 1, wherein the processing module and the serial control module communicate with each other by a universal asynchronous receiver/transmitter interface.

5. A power monitoring device electrically connected to a solar power generation device group and a power transforming device, the solar power generation device group including at least one solar power generation device, the power monitoring device comprising:

a processing module;

a serial control module electrically connected to the processing module;

a current detecting module including at least one current detecting unit, the current detecting module electrically connected to the processing module, the solar power generation device group, and the power transforming device for detecting at least one current value of the at least one solar power generation device of the solar power generation device group;

a voltage detecting module including at least one voltage detecting unit, the voltage detecting module electrically connected to the processing module and the solar power generation device group for detecting at least one voltage value of the at least one solar power generation device of the solar power generation device group; and a printed circuit board having at least one current input terminal, at least one current output terminal, at least one voltage detecting terminal and at least one electrical path;

wherein the at least one current input terminal is electrically connected to the at least one current output terminal through the at least one electrical path, and the at least one current detecting unit is arranged between the at least one current input terminal and the at least one current output terminal;

wherein the at least one voltage unit is electrically connected to the at least one voltage detecting terminal and the at least one electrical path;

wherein the printed circuit board further includes a DC power terminal, a first signal terminal, a second signal terminal, and a ground terminal, the DC power terminal, the first signal terminal, the second signal terminal, and the ground terminal are electrically connected to the serial control module.

6. The power monitoring device of claim 5, wherein the at least one voltage detecting unit includes a first impedance element, a second impedance element, a third impedance element, and a voltage comparator, wherein the first impedance element, the second impedance element, and the third impedance element are serially connected between the at least one voltage detecting terminal and the at least one electrical path, and wherein two input terminals of the voltage comparator are respectively connected to two connection nodes between the first impedance element, the second impedance element, and the third impedance element.

7. The power monitoring device of claim 5, wherein the current detecting unit includes a current detecting impedance element and a current comparator, the current detecting impedance element is arranged on a position along the at least one electrical path, two input terminals of the current comparator are electrically connected to two ends of the current detecting impedance element, respectively, and an output terminal of the current comparator is electrically connected to the processing module.

8. The power monitoring device of claim 5, further comprising a voltage regulator arranged between the DC power terminal and the processing module.

* * * * *